United States Patent
Garner et al.

(10) Patent No.: US 8,228,908 B2
(45) Date of Patent: Jul. 24, 2012

(54) APPARATUS FOR HARDWARE-SOFTWARE CLASSIFICATION OF DATA PACKET FLOWS

(75) Inventors: Trevor Garner, Apex, NC (US); William Lee, Cary, NC (US); Hanli Zhang, Morrisville, NC (US); Martin Hughes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1183 days.

(21) Appl. No.: 11/484,791

(22) Filed: Jul. 11, 2006

(65) Prior Publication Data

US 2008/0013532 A1    Jan. 17, 2008

(51) Int. Cl.
*H04L 12/28* (2006.01)
(52) U.S. Cl. .................. 370/389; 370/289; 370/473
(58) Field of Classification Search ............. 370/395.32, 370/395.31, 389, 289, 473, 474
See application file for complete search history.

(56) References Cited

U.S. PATENT DOCUMENTS

| | | | |
|---|---|---|---|
| 6,356,951 B1 * | 3/2002 | Gentry, Jr. ................... | 709/250 |
| 6,546,420 B1 * | 4/2003 | Lemler et al. ................ | 709/224 |
| 6,590,894 B1 * | 7/2003 | Kerr et al. .................... | 370/392 |
| 6,700,889 B1 * | 3/2004 | Nun ............................. | 370/392 |
| 6,771,646 B1 * | 8/2004 | Sarkissian et al. ........... | 370/392 |

* cited by examiner

*Primary Examiner* — Dang Ton
*Assistant Examiner* — Mandish Randhawa
(74) *Attorney, Agent, or Firm* — Stolowitz Ford Cowger LLP

(57) ABSTRACT

An apparatus for routing data packets includes a network interface, a memory, a general purpose processor and a flow classifier. The memory stores a flow structure. Every packet in one flow has identical values for a set of data fields in the packet. The memory stores instruction that cause the processor to receive missing flow data and to add the missing flow to the flow structure. The apparatus forwards a packet based on the flow. The flow classifier determines a particular flow and whether it is already stored in the flow structure. If not, then the classifier determines whether that flow has already been sent to the processor as missing data. If not, then the classifier stores into a different data structure data that indicates the flow has been sent to the processor but is not yet included in the flow data structure, and sends missing data to the processor.

31 Claims, 9 Drawing Sheets

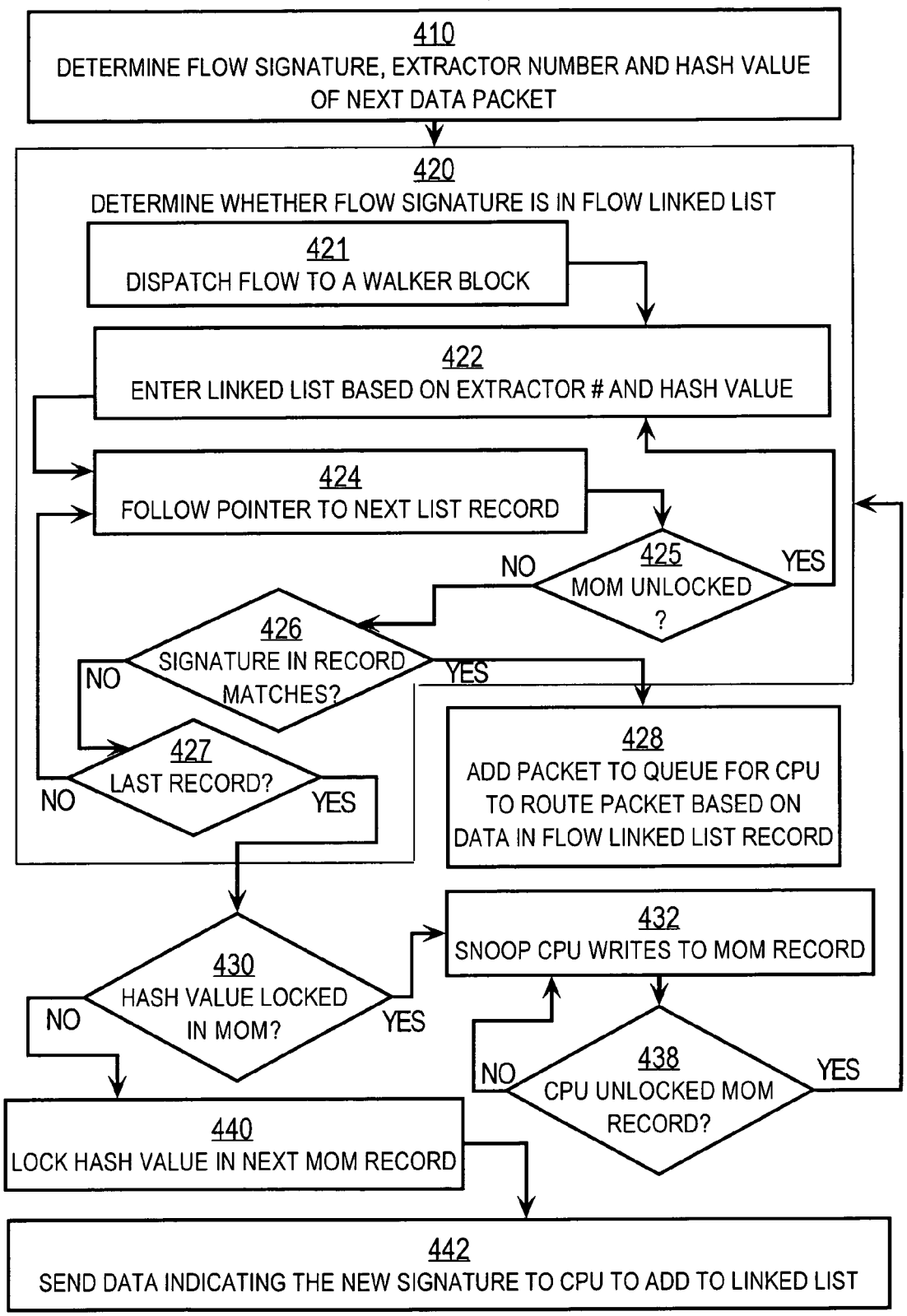

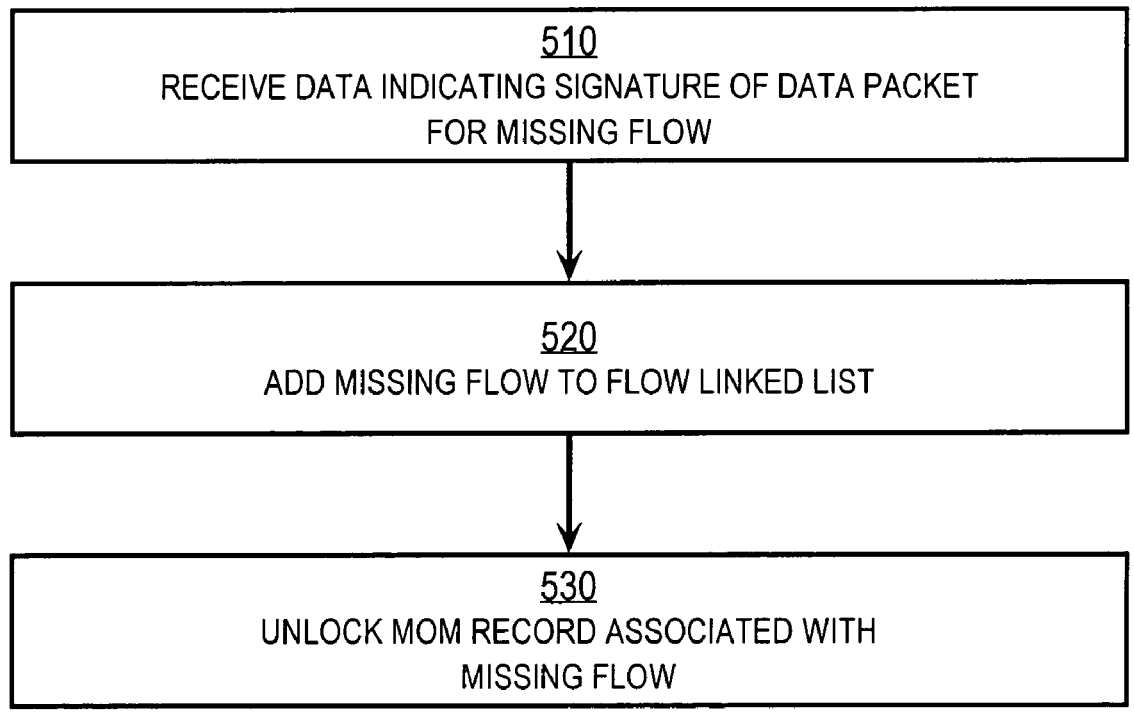

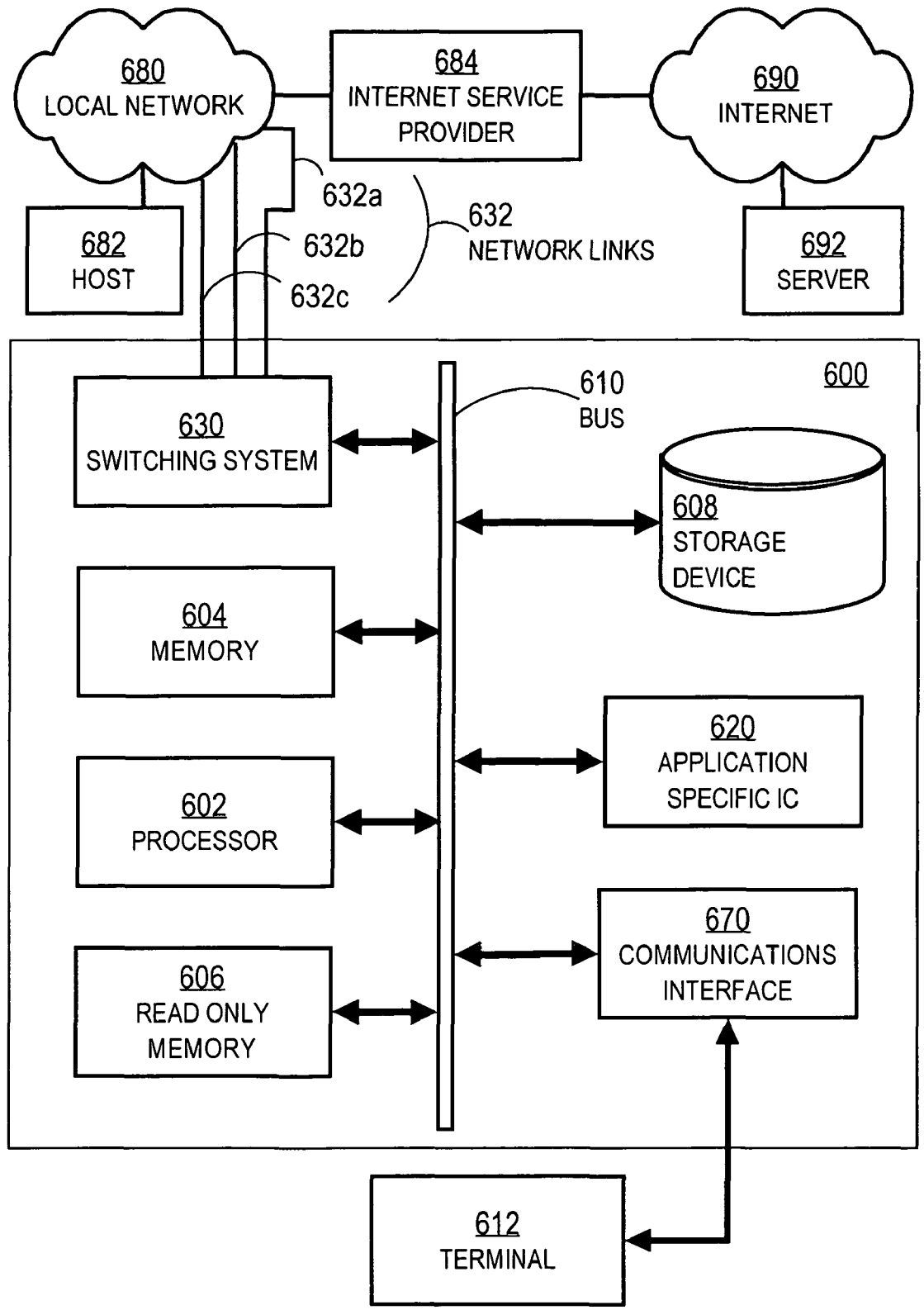

APPARATUS FOR HARDWARE-SOFTWARE CLASSIFICATION OF DATA PACKET FLOWS

BACKGROUND OF THE INVENTION

1. Field of the Invention

The present invention relates to routing packets through a network based on header information in a packet received at a network device; and, in particular, to increasing efficiency by classifying the packet as a member of a flow using hardware in which new flow identifiers are stored to prevent sending the same new flow more than once to a general-purpose processor.

2. Description of the Related Art

Networks of general purpose computer systems and special-purpose electronic devices connected by external communication links are well known. The networks often include one or more network devices that facilitate the passage of information between the computer systems and special-purpose devices. A network node is a network device, special-purpose device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher, layer of the OSI Reference Model. The header for a particular protocol typically indicates a type for the next protocol contained in its payload. The next protocol layer is said to be encapsulated in the first layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Routers and switches are network devices that determine which communication link or links to employ to support the progress of packets through the network. Routers and switches can employ software executed by a general purpose processor, called a central processing unit (CPU), or can employ special purpose hardware, or can employ some combination to make these determinations and forward the packets from one communication link to another. Switches typically rely on special purpose hardware to quickly forward packets based on one or more specific protocols. For example, Ethernet switches for forwarding packets according to Ethernet protocol are implemented primarily with special purpose hardware.

While the use of hardware processes packets extremely quickly, there are drawbacks in flexibility. As protocols evolve through subsequent versions and as new protocols emerge, the network devices that rely on hardware become obsolete and have to ignore the new protocols or else be replaced. As a consequence, many network devices, such as routers, which forward packets across heterogeneous data link networks, include a CPU that operates according to an instruction set (software) that can be modified as protocols change.

Software executed operations in a CPU proceed more slowly than hardware executed operations, so there is a tradeoff between flexibility and speed in the design and implementation of network devices.

Some current routers implement sophisticated algorithms that provide high performance forwarding of packets based on combining two or more fields in one or more headers. For example, instead of making forwarding decisions separately on each packet in a stream of related packets directed from the same source node to the same destination node, these routers identify the packet stream from a unique signature derived from the layer 2, layer 3 and layer 4 header information and forward each member of the stream according to the same decision made for the first packet in the stream. The packets that have the same signature are said to belong to the same packet stream or flow.

The throughput of many current routers is limited by the processing capacity of the CPU, i.e., the router performance is said to be CPU limited. To improve throughput of such routers, it is desirable to relieve the CPU load and replace some of the software functionality with hardware functionality, without losing the flexibility to adapt to evolving protocols. In particular, there is a desire to relieve the CPU of determining what flow a packet belongs to.

In one approach, a combination of one or more special purpose circuit blocks (hardware) is configured to determine the flow of a data packet received at the router. The hardware identifies the flow for the CPU by determining which of multiple previously identified flows the packet belongs to. The previously identified flows are stored in a flow data structure that the CPU has access to, such as a linked list data structure. In this approach, when a data packet arrives with a signature that does not match that of a flow in the linked list, the flow is called a missed flow—it is missing in the flow data structure. The missed flow identified in the first packet of that flow is sent to the CPU and the CPU adds the new flow to the flow data structure, e.g., the linked list.

An advantage of this approach is that the CPU is saved significant processing cycles, and hence time, by referencing previously stored information associated with each entry in the flow data structure that describes processing requirements for the flow.

A problem arises in this approach because multiple packets of the same flow often arrive in close succession. Thus there is a good chance the second packet of a flow arrives, to be classified by the hardware, before the CPU has finished adding the flow's signature from the first packet to the flow data structure. When the hardware finds the flow of the second packet missing, it would send the signature of the second packet to the CPU as a missed flow. The CPU would then add the same flow a second time to the flow data structure. Depending on the latency period for the CPU process to add the flow, the same flow would be entered into the data structure two, three or more times.

A problem with multiple entries in the flow data structure is that particular information associated with the flow will be associated with only one linked list entry and all the information may be spread over two or more linked list entries as new entries for the same flow are added to the head of the list. The CPU is then unable to find all the processing information needed in a flow linked list entry. CPU processing time is wasted computing and determining processing information that was already determined for the same flow earlier but stored in a different linked list entry.

One approach to prevent the multiple entries into the flow linked list is to have the CPU check each entry, after receiving missed flow data from the hardware, to ensure that the signature for the missed flow received from the hardware is not already in the linked list. A disadvantage of this approach is that CPU time is expended to check the list, thus reducing the capacity of the CPU to perform other tasks. With a CPU-limited router, the extra processing significantly decreases the router's throughput.

Based on the foregoing, there is a clear need to provide a hardware assist to ensure that the CPU adds one and only one entry to the flow data structure, such as the linked list, for each unique signature in one or more missed flows. Subsequent packets with the same signature must be recognized by the hardware circuit as belonging to the one and only one entry in the data structure.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram that illustrates a method for processing a packet in the flow classifier, according to an embodiment;

FIG. 5 is a flow diagram that illustrates a method for processing missing flow data in a CPU, according to an embodiment; and FIG. 6 is a block diagram that illustrates a general purpose router which may be modified by an embodiment of the invention.

DETAILED DESCRIPTION

An apparatus is described for classifying network packets in hardware. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments are described in the context of classifying data packets within flows based on information in the data link layer (layer 2) and internetwork layers (layer 3) and transport layer (layer 4); and using a linked list as a data structure for storing known flows. However, the invention is not limited to this context. In some embodiments, the routing of packets may be based on information in the header or payloads of protocols involving different layers and data structures other than linked lists may be used to store known flows and associated processing information.

1.0 Network Overview

Figure 1A:
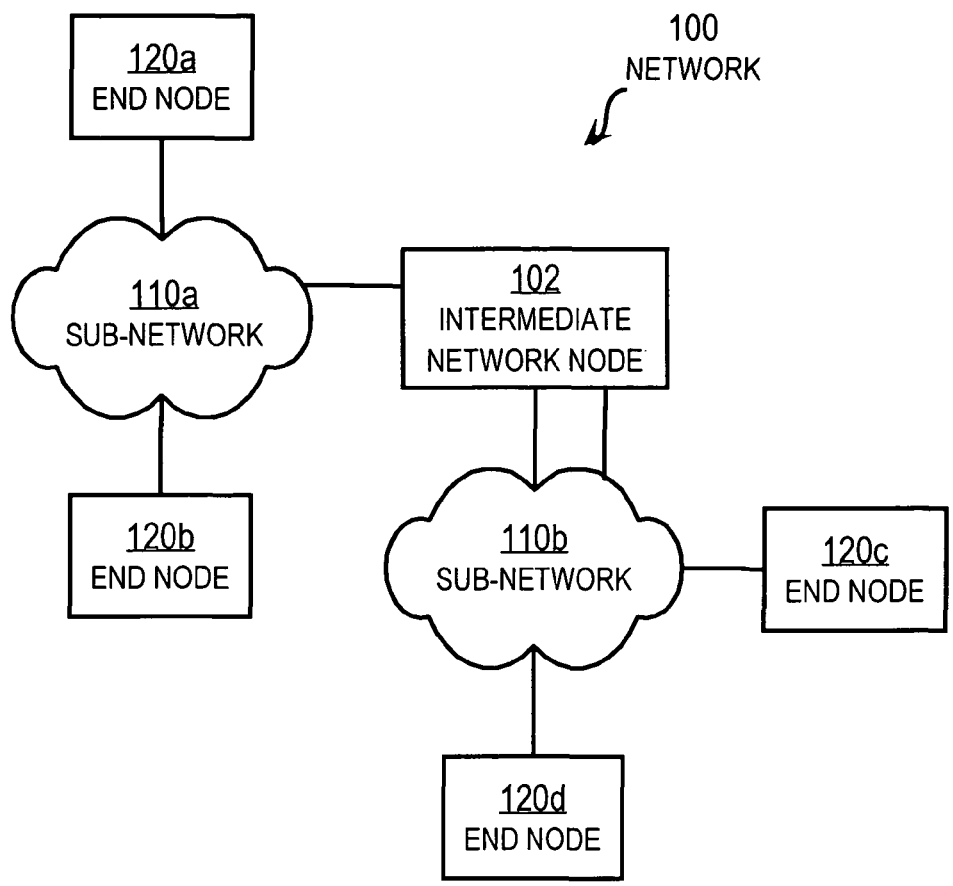
FIG. 1A is a block diagram that illustrates a network, according to an embodiment.

FIG. 1A is a block diagram that illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110b includes zero or more intermediate network nodes. Although, for purposes of illustration, intermediate network node 102 is connected by one communication link to sub-network 110a and thereby to end nodes 120a, 120b and by two communication links to sub-network 110b and end nodes 120c, 120d, in other embodiments an intermediate network node 102 may be connected to more or fewer sub-networks 110 and directly or indirectly to more or fewer end nodes 120.

Figure 1B:
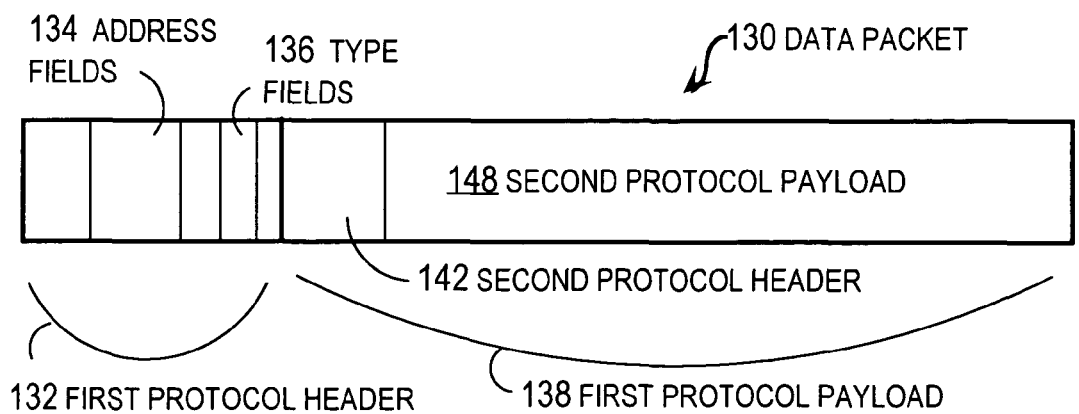
FIG. 1B is a block diagram that illustrates a packet of data communicated over a network.

FIG. 1B is a block diagram that illustrates a data packet 130 communicated over a network, such as network 100. Each packet typically comprises one or more payloads of data, e.g. payloads 138, 148, each encapsulated by at least one protocol header, e.g., headers 132, 142, respectively. For example, payloads are encapsulated by appending a header before the payload, sometimes called prepending a header, and sometimes by appending a tail after the payload. Each header 132, 142 is formatted in accordance with a corresponding network communication protocol; header 132 is formatted according to a first protocol and header 142 is formatted according to a second protocol. The header 142 for the second protocol is included within the payload 138 of the first protocol. The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver addresses for the first protocol are located within the packet 130. A packet's protocol headers often include a data-link (layer 2) header, and possibly an internetwork (layer 3) header and possibly a transport (layer 4) header.

The physical (layer 1) header defines the electrical, mechanical and procedural mechanisms for proper capture of data packet, such as an Ethernet frame, but is not captured by a Media Access Controller.

The data-link header provides information for transmitting the packet over a particular physical link (i.e., a communication medium), such as a point-to-point link, Ethernet link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination end nodes. More specifically, the packet is generated in the source node by a software application assigned to the source port number. Then, the packet is forwarded to the destination node and directed to the software application assigned to the destination port number. The transport header also may include error-checking information (e.g., a checksum) and other data-flow control information. For instance, in connection-oriented transport protocols such as the Transmission Control Protocol (TCP), the transport header may store sequencing information that indicates the packet's relative position in a transmitted stream of packets.

As used herein, a packet flow is a stream of packets that is communicated from a source node to a destination node. Each packet in the flow satisfies a set of predetermined criteria, e.g., based on relevant fields of the packet's header. An intermediate network node may be configured to perform "flow-based" routing operations so as to route each packet in a packet flow in the same manner. The intermediate node typically receives packets in the flow and forwards the packets in accordance with predetermined routing information that is distributed in packets using a routing protocol, such as the Open Shortest Path First (OSPF) protocol. Because each packet in the flow is addressed to the same destination end node, and sometimes the same application, the intermediate node need only perform one forwarding decision for the entire packet flow, e.g., based on the first packet received in the flow. Thereafter, the intermediate node forwards packets in the packet flow based on the flow's previously determined routing information (e.g., adjacency information). In this way, the intermediate node consumes fewer resources, such as processor and memory bandwidth and processing time, than if it performed a separate forwarding decision for every packet in the packet flow.

In practice, the intermediate network node identifies packets in a packet flow by a combination of information that acts as a signature for the packet flow. In this context, a signature is a set of values that remain constant for every packet in a packet flow. For example, assume each packet in a first packet flow carries the same pair of source and destination IP address values. In this case, a signature for the first packet flow may be generated based on the values of these source and destination IP addresses. Likewise, a different signature may be generated for a second packet flow whose packets carry a different set of source and destination IP addresses than packets in the first packet flow. Of course, those skilled in the art will appreciate that a packet flow's signature information is not limited to IP addresses and may include other information, such as TCP port numbers, IP version numbers and so forth.

When a packet is received by the intermediate network node, signature information is extracted from the packet's protocol headers and used to associate the received packet with a packet flow. The packet is routed in accordance with the decisions already made, if any, for that flow.

The intermediate network node typically receives a large number of packet flows from various sources, including end nodes and other intermediate nodes. Each source may be responsible for establishing one or more packet flows with the intermediate node. To optimize use of its processing bandwidth, the intermediate node may process the received flows on a prioritized basis. That is, as packets are received at the intermediate node, they are identified as belonging to, for example, a high or low priority packet flow. Packets in the high-priority flow may be processed by the intermediate node in advance of the low-priority packets, even if the low-priority packets were received before the high-priority packets.

According to embodiments of the invention described below, the intermediate network node 102 is configured to reduce the burden on a central processing unit during the routing of packet flows.

2.0 Structural Overview

A general purpose router which may serve as the network node 102 in some embodiments is described in greater detail in a later section with reference to FIG. 6. At this juncture, it is sufficient to note that the router 600 includes a general purpose processor 602 (i.e., a CPU), a main memory 604, and a switching system 630 connected to multiple network links 632. According to some embodiments of the invention, switching system 630 is modified as described in this section.

Figure 2A:
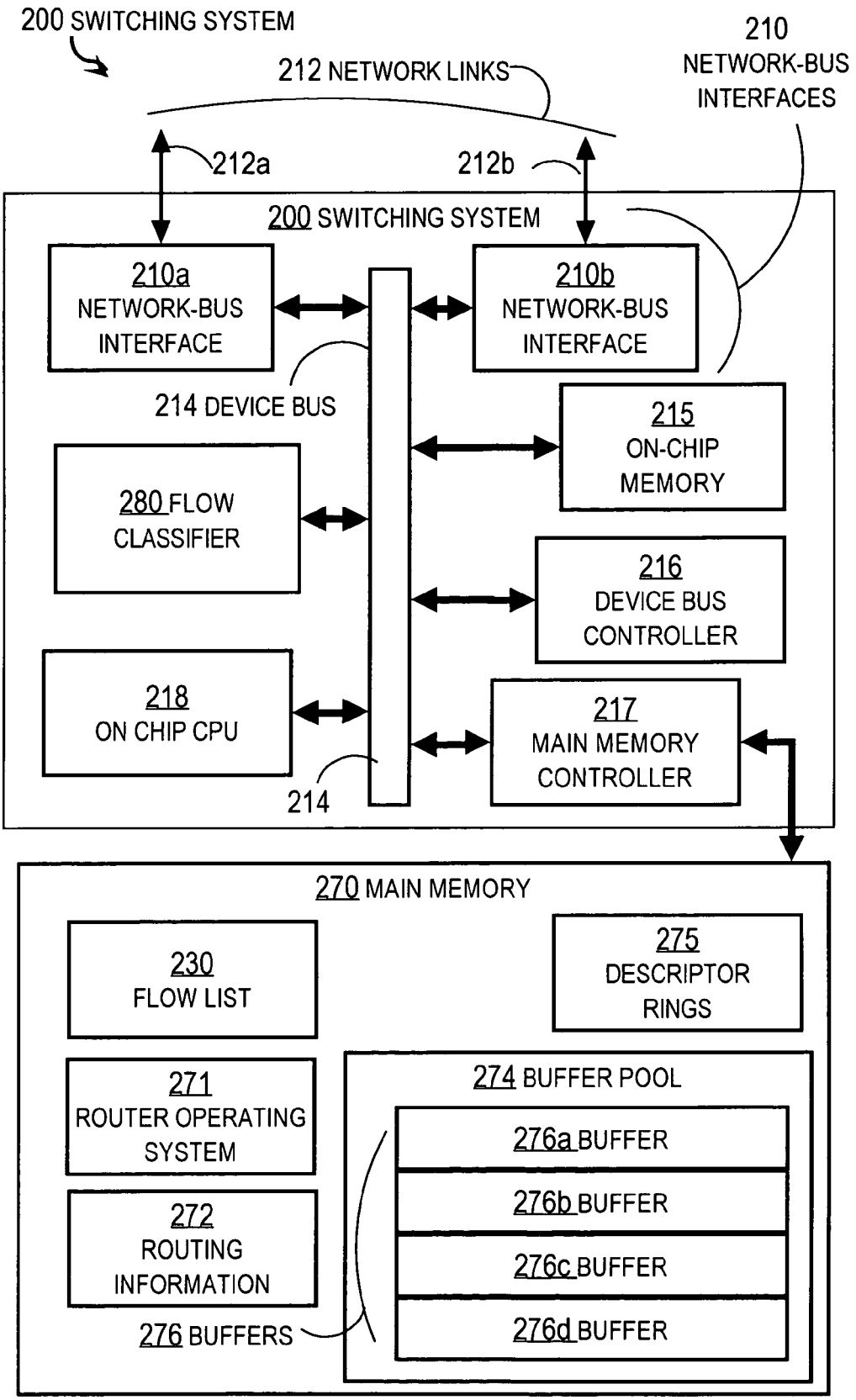
FIG. 2A is a block diagram that illustrates a switching system in a router that uses a main memory of the router and a flow classifier circuit block, according to an embodiment.

FIG. 2A is a block diagram that illustrates a switching system 200 that uses a main memory 270 of a router (e.g., memory 604 of router 600) to control the routing of packets across network links 212 (e.g., 632), according to an embodiment. The switching system 200 includes a device bus 214, device bus controller 216, multiple network-bus interfaces 210, on-chip CPU 218, main memory controller 217, on-chip memory 215 and flow classifier 280.

The device bus 214 is a local bus for passing data between the components of switching system 200. In some embodiments, the device bus 214 is a fast device bus (FDB) that has greater bandwidth than a main bus used with main memory, such as bus 610 depicted in FIG. 6 and described in a later section.

Each network-bus interface 210, such as network-bus interfaces 210a, 210b, includes circuitry and logic to couple the device bus 214 to a network link 212.

A main bus interface (not shown) includes circuitry and logic to couple data on device bus 214 to a main bus (e.g., bus 610 in FIG. 6) and data on a main bus to the device bus 214. The memory controller 217 comprises circuitry and logic configured to store and retrieve data in main memory 270. In some embodiments, main memory controller 217 is connected directly to a main bus for transferring data to the main memory. In some embodiments, main memory controller sends data to main memory 270 by transferring data through the main bus interface (not shown).

The on-chip CPU 218 is a general purpose processor that performs operations on data based on instructions received by the CPU 218, as described in more detail below for processor 602. In some embodiments, multiple on-chip CPUs are included. Although the illustrated on-chip CPU 218 is situated in the switching system 200, it is also expressly contemplated that the on-chip CPU may reside in a separate module coupled to the switching system 200, or the functions performed by the on-chip CPU 218 (or a portion thereof) may be performed by a separate CPU connected to the main bus (such as CPU 602 connected to main bus 610, described below). In some embodiments, on-chip CPU 218 is omitted.

The bus controller 216 comprises circuitry and logic that, among other operations, implements an arbitration policy for coordinating access to the device bus 214. That is, the controller 216 prevents two or more entities, such as the network-bus interfaces 210, memory controller 217, etc., from attempting to access the bus 214 at substantively the same time. To that end, the bus controller 216 may be configured to grant or deny access to the bus 214 based on a predefined arbitration protocol.

The on-chip memory 215 comprises a set of addressable memory locations resident on the switching system 200. The on-chip memory may be a form of volatile memory, such as static RAM (SRAM), or a form of erasable non-volatile memory, such as Flash memory. Although the illustrated on-chip memory 215 is situated in the switching system 200, it is also expressly contemplated that the on-chip memory may reside in a separate memory module coupled to the switching system 200, or the contents of the on-chip memory (or a portion thereof) may be incorporated into the main memory 270. For purposes of illustration, all data structures are described as if resident on main memory 270. However, it is expressly contemplated that some or all of the data structures in main memory 270 reside in one or more on-chip memories 215

The main memory 270 includes instructions for a router operating system 271, routing information 272, and a buffer pool 274. The buffer pool includes multiple buffers 276 of a certain size, e.g., buffers 276a, 276b, 276c, 276d, for storing data from one or more packets. In an illustrated embodiment, buffers 276 are each two thousand forty eight bytes (2 kilobytes, KB) in size; sufficient to hold an entire non-jumbo Ethernet (E/N) packet, which is always less than or equal to 1,518 bytes in size. Data from no more than one packet is held in any one buffer. Several buffers 276 are used to hold a jumbo E/N packet greater than 2 KB in size. The main memory 270 also stores one or more descriptor rings 275. As used herein, a ring is a circular first-in, first-out (FIFO) queue of records, where a record is a number of fields stored in a certain number of bytes. Each network interface in a network-bus interface 210 is associated with at least one ring in the descriptor rings 275. Each descriptor record (called herein a descriptor) in a descriptor ring is associated with one data packet buffer and holds data that points to the location of the buffer that holds data for a data packet, and is otherwise used to manage data from that data packet. The main memory also includes flow list 230, which lists the flows known to a router CPU (e.g., either the on-chip CPU 218 or router CPU 602 or both).

When a packet is received at a network interface, data from the packet is forwarded by the network-bus interface 210 using the main memory controller 217 to an available data buffer 276 in the main memory 270. The router operating system instructions 271 causes a memory reference to the data buffer to be inserted in a descriptor record which is enqueued in the descriptor ring 275 and associated with the network bus interface 210 that received the packet. Data from the packet is stored and descriptors are enqueued in this manner until the network bus interface 210 determines that an entire packet 130 has been received or an error has occurred. Accordingly, the network interface's descriptor ring 275 stores an ordered list of descriptor records corresponding to the order in which the data in a packet is received at the interface of a network-bus interface. A reference to the packet is also forwarded to the flow classifier 280, so that the flow classifier can determine the flow the packet belongs to, if known, and to determine the missing flow data, if the flow is not already known. The flow classifier 280 response is sent to the CPU (e.g., CPU 218 or CPU 602) so that the CPU uses information associated with the known flow in flow list 230, or adds the unknown (missed) flow to the flow list 230.

Figure 2B:
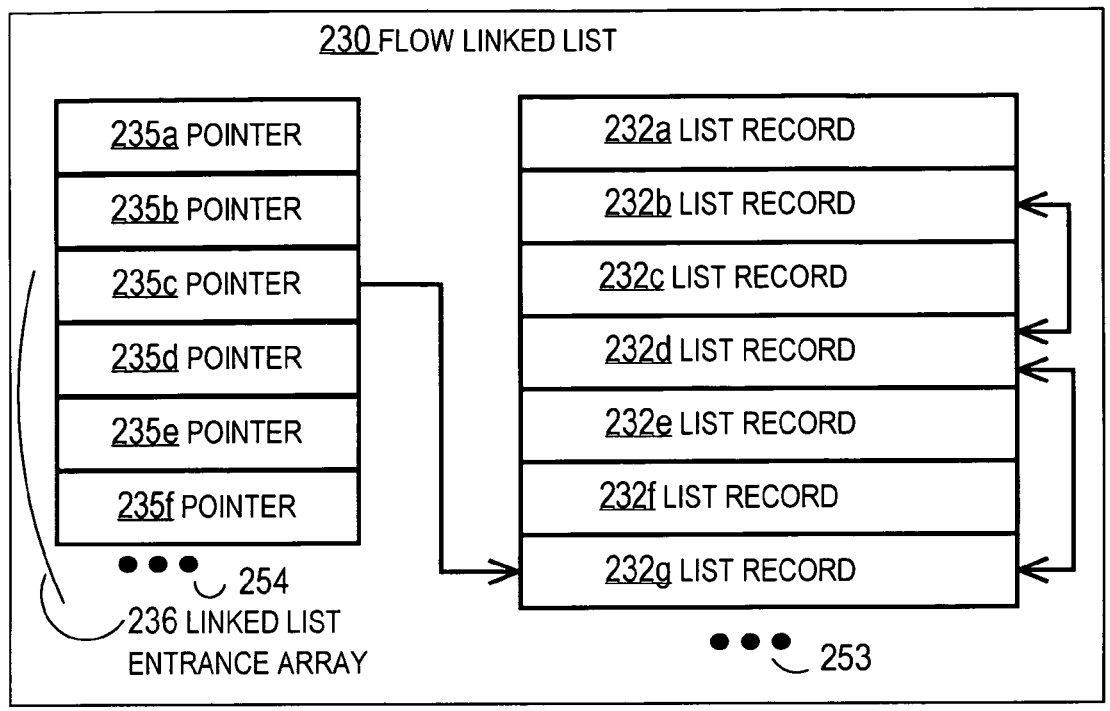
FIG. 2B is a block diagram that illustrates a flow linked list data structure in memory, according to an embodiment.

FIG. 2B is a block diagram that illustrates a flow linked list data structure 230 in memory, according to an embodiment. The flow structure includes multiple list records, such as list records 232a, 232b, 232c, 232d, 232e, 232f, 232g and others indicated by ellipsis 253, collectively referenced hereinafter as list records 232. A list is made up of an ordered sequence of list records. The ordering is indicated by pointers in each list record that give the location of the next record in the list, or the previous record in the list, or both. A different flow is indicated by data in each list record. The CPU adds new flows to the list by adding the flow data to an available list record and updating the pointers, as described in more detail below. For example, list record 232g points to list record 232d. List record 232d points back to list record 232g and forward to list record 232b.

In order that all list records do not need to be searched to find whether a particular signature is in the flow linked list, the list records 232 are divided among multiple separately-searchable lists. A linked list entrance array 236 is included in flow linked list 230 to serve as entry points to the separately-searchable lists. The entrance array 236 includes pointers, such as pointers 235a, 235b, 235c, 235d, 235e, 235f and other indicated by ellipsis 254, collectively referenced hereinafter as pointers 235. Each pointer 235 gives the location of a first list record in a separately-searchable list. For example, pointer 235c gives a location of list record 232g, the first list record in the illustrated linked list that includes, in sequence, list records 232g, 232d, 232b. All possible flows are divided among the separately-searchable lists.

Any method may be used to group a subset of flows into one separately searchable list. In an illustrated embodiment, the flows are grouped into different lists based on a hash value produced by a 32-bit cyclical redundancy check (CRC) hash function, well known in the art, operating on the flow signature. The first eight bits of the CRC hash are used to divide all possible flows into $2^8=256$ separately-searchable lists. Thus, when the flow classifier 280 determines a particular signature of a data packet, the first 8 bits of the CRC hash of that particular signature indicate a position in linked list entrance array 235 which points to the first list record of the separately-searchable list to be searched for that signature.

Figure 2C:
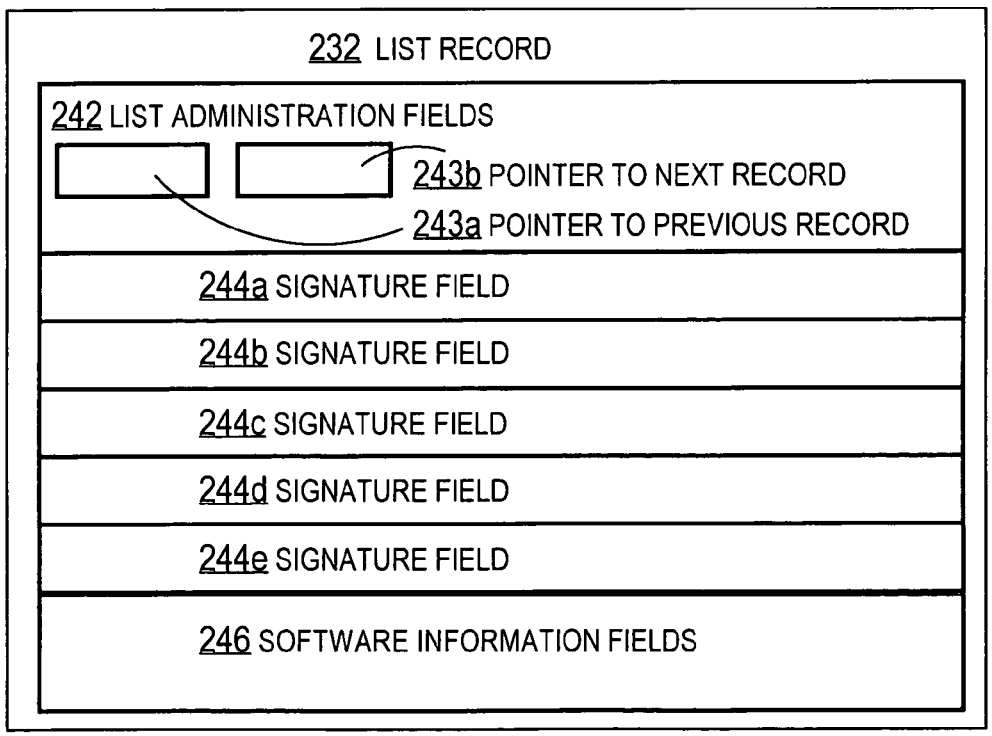
FIG. 2C is a block diagram that illustrates a flow linked list record in memory, according to an embodiment.

FIG. 2C is a block diagram that illustrates a list record 232 in memory, according to an embodiment. In the illustrated embodiment, the list record 232 includes multiple fields. For purposes of illustration, the record is shown as a series of 64-bit portions that serve as memory access units. The first 64 bits include administration fields 242 for managing the list record's place in a linked list. The administration fields 242 include a previous pointer 243a to a location of a previous list record, if any, on the list and a next pointer 243b to a location of a next list record, if any, on the list. In some embodiments, null values in the pointer 243a or pointer 243b indicate there is no previous or following list record in a linked list, respectively.

It is assumed for purposes of illustration, that the signature includes 320 bits constructed by concatenating IP source and destination fields from the IP header and TCP source and destination ports from the TCP header. Such a 320-bit signature for a particular flow is stored in the next five 64-bit portions (e.g., signature fields 244a to 244e) of the list record 232. In the following portions of the record are stored software information fields 246. The fields 246 store information used by the software to determine how to process packets of that particular flow.

Figure 2D:
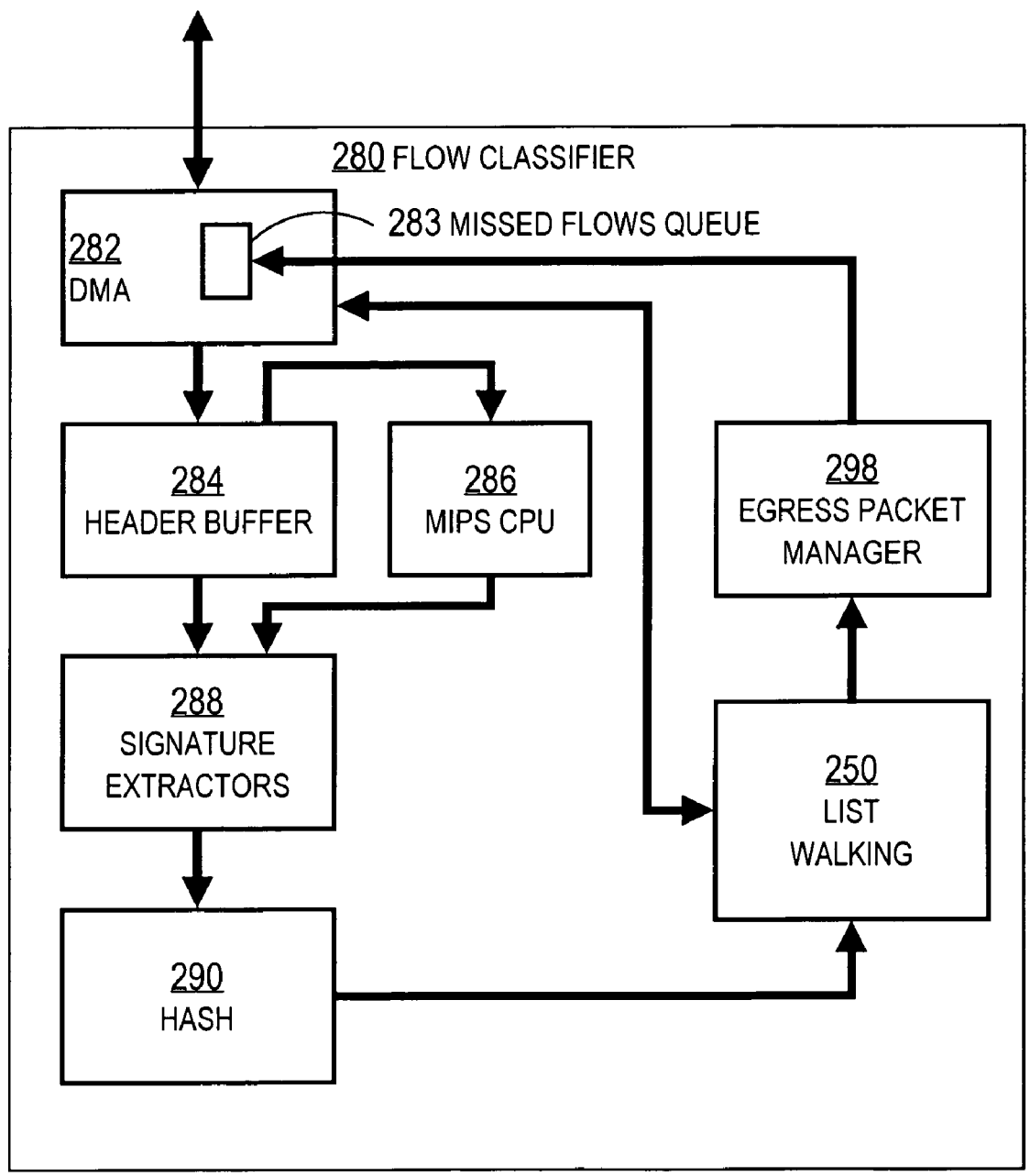
FIG. 2D is a block diagram that illustrates a flow classifier, according to an embodiment.

FIG. 2D is a block diagram that illustrates a flow classifier 280, according to an embodiment. The flow classifier 280 is a circuit block that includes a direct memory access (DMA) circuit block 282, a MIPS CPU 286 from MIPS TECHNOLOGIES™ of Palo Alto, Calif., a header buffer memory block 284, a signature extractors block 288, a hash block 290, a list walking block 250, and an egress packet manager block 298.

The DMA block 282 is configured to access main memory, either directly or through the main memory controller 217. When a packet is forwarded to the flow classifier 280, a reference to the descriptor record for the packet is received by DMA block 282, a pointer in the descriptor record is used to retrieve the header portion of the packet from the appropriate buffer 276. The header portion of the packet is stored in header buffer 284 on the flow classifier block 280. The DMA block 282 includes a missed flow queue 283. When the flow classifier 280 determines that a packet has a flow signature that is not in the flow list 230 and not already sent to the CPU, then data indicating that flow signature as a missed flow is added as a queue entry to the missed flows queue 283, as described in more detail below. Each missed flow entry holds data that indicates a pointer to the flow signature in memory as well as data that indicates a hash value for the flow. As described elsewhere, the hash value is used as an index into the Linked List Entrance Array (236). The DMA block writes entries from the missed flows queue to a location in main memory 270, where the CPU reads the information when the CPU is ready. The DMA also throws an interrupt to the CPU to cause the CPU to process the missed flow data as soon as the data is sent.

The header buffer 284 holds header data for one or more protocols in the data packet to be classified. For example, the header buffer 284 includes the header portions for the layer 2 and layer 3 headers. The MIPS CPU 286 is a commercially available reduced instruction set computer (RISC) CPU that is inexpensive, small and flexible. In other embodiments other CPUs are used. In the flow classifier 280, the CPU 286 is programmed to determine the kind of data packet just received and the location of the first header used to determine the packet flow signature. Layer 3 and layer 4 protocol headers arrive encapsulated in different layer 2 and layer 2.5 protocols, so the fields used to form the signature occur at different bit locations in the data packet. The MIPS CPU 286 determines the type of data packet and the beginning location in header buffer 284 of the header used to form the flow signature.

The signatures extractors block 288 retrieves the values of the fields that define the signature from the header buffer 284 and concatenate them together to form the signature. In the illustrated embodiment, extractors block 288 includes multiple extractors, a different extractor for each type of data packet as determined by the CPU 286. The particular extractor employed to determine the signature from the data packet header in buffer 284 is determined based on the type of data packet determined by the MIPS CPU 286. It is assumed for purposes of illustration that the signature includes 320 bits of data from the flow definition set of fields.

In an illustrated embodiment, each different packet type uses a different portion of flow lists 230 in main memory 270. Each portion of memory is indicated by a memory location offset associated with each packet type (and hence with each extractor). The extractor number is passed along with the signature value to the hash block 290.

The hash block 290 determines a 32-bit cyclic redundancy check (CRC) hash based on the 320 bit signature. As described above, the first 8 bits of the resulting hash value are used to locate, in a 256-element entrance array 236, a particular pointer to a particular linked list of multiple separately-searchable linked lists in the flow linked list data structure 230. In other embodiments, other hash functions are used in hash block 290 and the same, more or fewer bits are used to locate a pointer in an entrance array with a same or different number of pointers. In the illustrated embodiment, the hash value, the signature and the extractor number are passed to the list walking block 250.

The list walking block 250 is configured to walk one of the separately-searchable linked lists based on the hash value until it finds either the end of the list or a list record that includes a match for the 320-bit signature of the packet, whichever occurs first. The linked list in the main memory is accessed through DMA block 282. If a list entry that includes the 320-bit signature is found, the location of that record is passed to the CPU. The CPU uses the software information fields 246 in that list record to determine how to process the data packet. If the end of the linked list is found before a list record that matches the packet signature, then the packet's flow is a potentially missed flow. The list walking block 250 processes the potentially missed flow as described in more detail below to avoid sending the potentially missed flow to the CPU more than once. If it is determined that the potentially missed flow has not previously been passed to the CPU, then the flow is a actual missed flow, and the actual missed flow is passed with the hash value for the CPU to use in adding the missed flow to the appropriate linked list.

In an illustrated embodiment, the list walking block 250 includes multiple list walker blocks that together search several of the separately-searchable linked lists in parallel. These are described in more detail in the following section.

In the illustrated embodiment, the signature determined to be an actual missed flow is stored in a list record 232 in memory 270 that is not linked to other list records. For example, using DMA block 282, the signature is stored in signature fields 244a, 244b, 244c, 244d, 244e in a list record 232 in main memory 270 in which the pointers 243a, 243b are not set or contain null values. Such a record is called herein an unlinked list record. The location of the unlinked list record is passed along with the descriptor record location for the associated data packet to the egress packet manager 298.

For an actual missed flow, the egress packet manager block 298 places the location of the unlinked list entry and the hash value (used as an entry point into the appropriate list) and the extractor number into the missed flows queue. The egress manager also updates the packets descriptors to indicate that the data packet belongs to a missed flow. Adding an entry to a queue is equivalent to putting one or more descriptors all referencing the same packet onto a descriptor ring. For single descriptor packets a descriptor is a queue entry. The egress manager block 298 also changes the ownership of the descriptor entry in the descriptor ring to the CPU, indicating that the flow classifier is finished with processing the data packet. When the CPU next processes that packet, it sees that the packet belongs to a missed flow and adds the missed flow to the linked list data structure 230 based on information in the missed flows queue 283.

When a flow is found in the linked list by the list walking block 250, the location of the list record is passed to the egress packet manager 298. The egress manager 290 updates the data packet descriptor to indicate the location of the list record for the found flow. By putting a descriptor (or queue entry) onto a hit queue (also known as a hit descriptor ring), the CPU understands that this entry is for a found flow. As described above, the egress manager block 298 also changes the ownership of the descriptor entry in the descriptor ring to the CPU, indicating that the flow classifier is finished with processing the data packet. When the CPU next processes that packet, it sees that the packet belongs to a found flow and uses the information in the software information fields 246 to process the data packet.

3.0 List Walking Circuit Block

According to embodiments of the invention, the list walking block 250 includes structures that allow the list walking block to determine whether a potentially missed flow has already been passed for the CPU; and, therefore, should not be passed as a missed flow again.

Figure 3A:
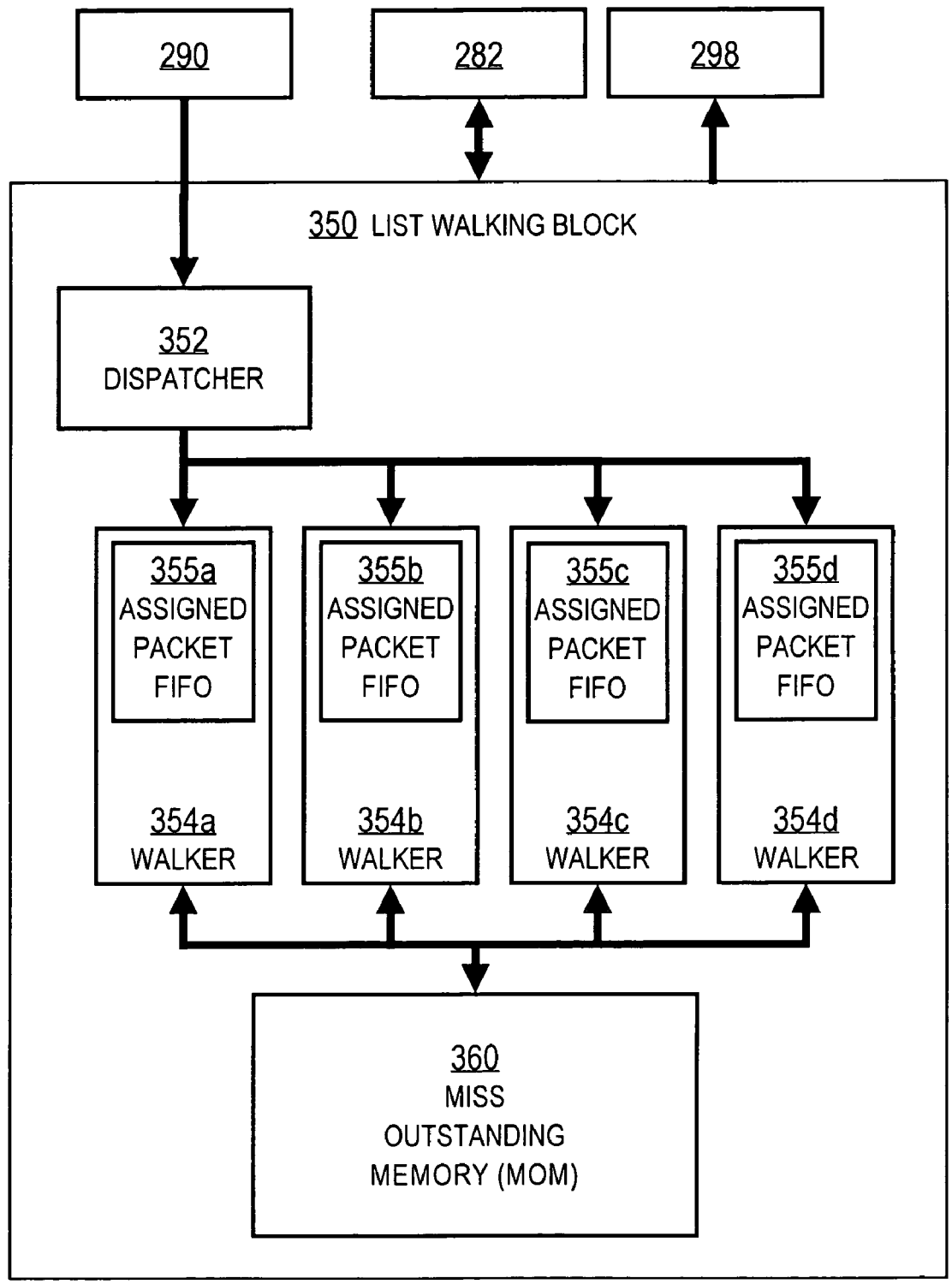
FIG. 3A is a block diagram that illustrates a list walking circuit block, according to an embodiment.

FIG. 3A is a block diagram that illustrates a list walking circuit block 350, according to an embodiment. List walking block 350 is a particular embodiment of list walking block 250. In the illustrated embodiment, list walking block 350 includes four walker blocks 354a, 354b, 354c, 354c, collectively referenced hereinafter as walker blocks 354. The list walking block 350 also includes a packet dispatcher 352 and a miss outstanding memory (MOM) 360. Although four walker blocks are depicted in FIG. 3A, in other embodiments more or fewer walker blocks are included in list walking block 350.

Each walker block 354 is configured to search one of the separately-searchable linked lists. The walker blocks 354 use the DMA 282 to reach on chip memory 215 or main memory 270. The walker blocks 354 include assigned packet FIFO register arrays 355a, 355b, 355c, 355d (collectively referenced hereinafter as assigned packet FIFOs 355) found in walker blocks 354a, 354b, 354c, 354d, respectively. FIFO 355 is used to store packets where the walker is already searching for the same packet flow. This avoids having 2 walkers both looking for the same flow and helps avoid ordering problems. Each assigned packet FIFO 355 holds data that indicates one or more data packets for which a flow signature is to be searched in the linked lists data structure 230 by the corresponding walker block 354. In the illustrated embodiment, a data packet is indicated by location of a descriptor record in a descriptor ring in main memory 270. Each register in an assigned packet FIFO 355 includes data that indicates the descriptor record for the data packet, the signature of the data packet, the extractor number of the extractor that determined the signature, and the hash value. In some embodiments each register in an assigned packet FIFO 355 includes data that indicates more or less or different information. For example, in some embodiments, the signature, hash value and extractor number are not stored for each FIFO entry because the current packet has the same values as the matching packets.

The packet dispatcher 352 is configured to allocate the flow received from the hash block 290 to one of the walker blocks 354 by placing the packet descriptor location and signature information and hash value into the assigned packet FIFO 355 of the corresponding walker block 354. Any method may be used by the dispatcher to assign a data packet flow signature to a walker block. In an illustrated embodiment, the dispatcher is configured to search the zero or more signatures already assigned to a walker block 354 by comparing the signature, extractor number and hash value to that of the packet being walked. A new packet is assigned to a walker block 354 that is already searching for the same packet flow, if any. If a matching flow is not found, the new packet is assigned to an unused walker. In some embodiments, the assignment is made based on the same hash value instead of the same signature, so that different walker blocks 354 are walking different separately-searchable linked lists. In some embodiments, the list walking block includes only one walker block and the packet dispatcher 352 is omitted.

Figure 3B:
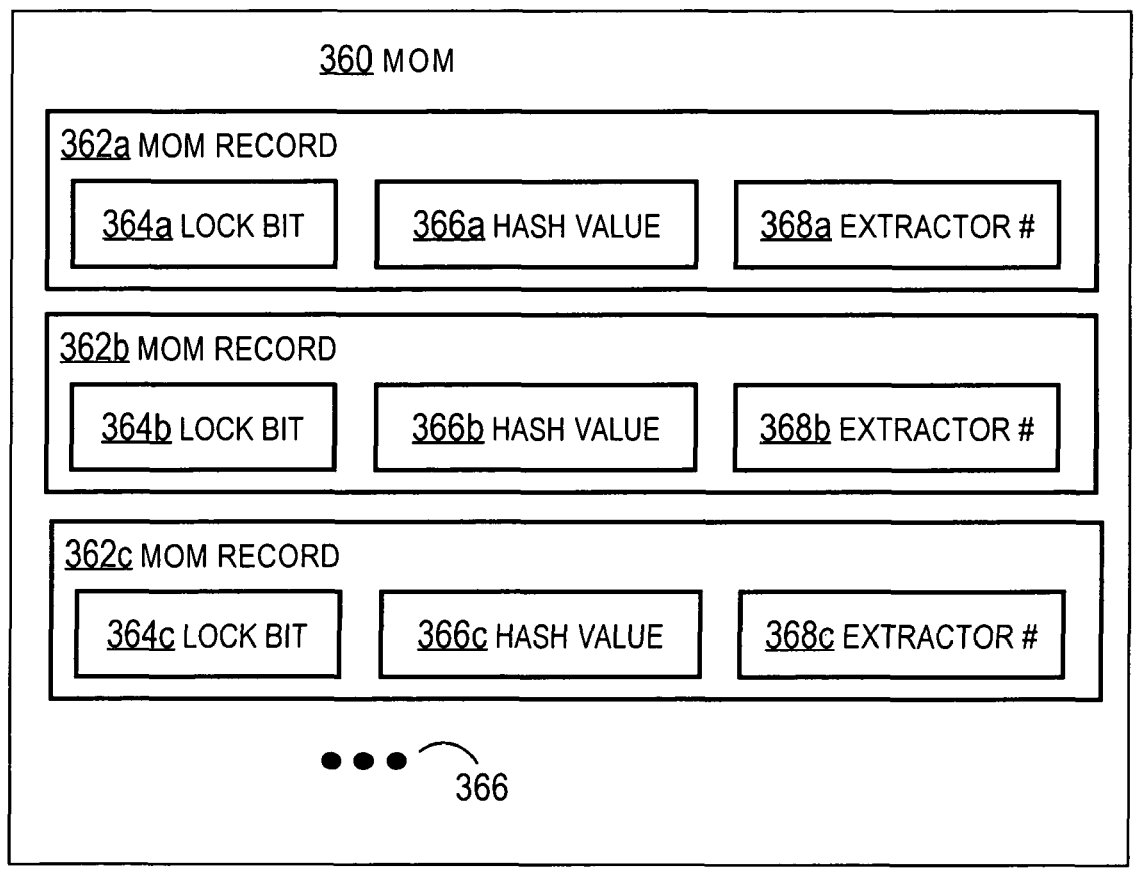
FIG. 3B is a block diagram that illustrates a miss outstanding memory (MOM) on the list walking circuit block, according to an embodiment.

The miss outstanding memory 360 holds data that indicates missed flows already found by the walker blocks 354 but not yet added to the linked list 230 by the CPU (e.g., on-chip CPU 218 or main CPU 602). FIG. 3B is a block diagram that illustrates a miss outstanding memory (MOM) on the list walking block, according to an embodiment. In the illustrated embodiment, the MOM 360 includes zero or more MOM records, such a MOM records 362a, 362b, 362c and others indicated by ellipsis 366, collectively referenced hereinafter as MOM records 362.

The MOM records 362 include hash value fields 366a, 366b, 366c and others (collectively referenced hereinafter as hash values 366) found in MOM records 362a, 362b, 362c, and others, respectively. Each hash value holds data that indicates a hash value associated with a missed flow found by a walker block 354. The MOM records 362 also include extractor number fields 368a, 368b, 368c and others (collectively referenced hereinafter as extractor #s 368) found in MOM records 362a, 362b, 362c, and others, respectively. Each extractor # holds data that indicates an extractor number of an extractor that determined the signature of the missed flow found by a walker block 354.

The MOM records 362 also include lock bits 364a, 364b, 364c and others (collectively referenced hereinafter as lock bits 364) found in MOM records 362a, 362b, 362c, and others, respectively. Each lock bit has one value, e.g., binary "1", when the MOM record is written by a walker block and a different value, e.g., "0", after the CPU adds the missed flow to the linked list data structure 230 and writes the different value to the lock bit.

According to various embodiments, a MOM record 362 is written to and locked in the MOM 360 when a missed flow is found and passed to the CPU to add to a linked list. The MOM record is cleared (unlocked) when the CPU adds the flow to the linked list and writes an unlock value to the lock bit 364.

In an illustrated embodiment, the MOM is configured like a content access memory so that a walker block 254 can search in one cycle for a lock bit associated with a given hash value and extractor #. The search returns data that indicates no match if the hash value and extractor number are not found in any MOM record, and the search returns data that indicates the lock bit value if a match is found. In some embodiments, the search returns a locked bit value (e.g., binary 1) if the entry is found with the locked bit set and an unlocked value (e.g., binary 0) if no match is found or a match is found with the lock bit released.

4.0 Method at List Walking Circuit Block

FIG. 4 is a flow diagram that illustrates a method 400 for processing a packet in the flow classifier, according to an embodiment. Although steps are shown in FIG. 4 and subsequent flow diagrams in a particular order for purposes of illustration, in other embodiments steps may be performed in a different order, or overlapping in time, or one or more steps are omitted or changed in some combination or ways. In an illustrated embodiment, the steps of method 400 are performed by several of the circuit blocks constituents of the flow classifier depicted in FIG. 2D.

In step 410, the flow signatures, extractor number and hash value are determined for a next data packet to be processed by the flow classifier. For example, step 410 is performed over several clock cycles by blocks 282, 284, 286, 288 and 290, as described above.

In step 420, it is determined whether the flow signature is found in the linked list data structure 230 in memory 270. If so, control passes to step 428. If not, control passes to step 430. Step 420 is performed by list walking block 350.

In step 428, a message is added to a queue being processed by the CPU. The CPU routes the packets in the queue based on data in the flow linked list record where the signature is found. For example, a message is sent to a queue for the CPU over device bus 214 that indicates a location in memory of the list record where the signature is found. In some embodiments, the data indicates a memory location offset associated with an extractor number, and a relative location relative to the offset. The CPU then uses the information in software information fields 246 to process and route the data packet.

If it is determined in step 420 that the flow signature is not found in the linked list data structure 230 in memory 270, then the flow is a potentially missed flow, and control passes to step 430.

In step 430, it is determined whether the hash value and extractor number for the signature of the potentially missed flow is in the MOM 360 with the lock bit 364 set. For example, a CAM-like search is done of the entire MOM 360 during one clock cycle based on the hash value and extractor number. If no match is found in the MOM 360, then the missed flow has not yet been sent to the CPU and control passes to step 440. In step 440, the hash value and extractor number are placed in the MOM 360 with the lock bit set. Control then passes to step 442.

In step 442 data indicating the new signature is sent to the CPU so that the CPU can add the new flow to the linked list. In the illustrated embodiment, the signature is written to an unlinked list record. The location of the unlinked list record and the hash value for the signature are written to an entry for the missed flow queue 283 and sent to egress packet manager 298. The egress packet manager updates the descriptor entry to indicate the packet belongs to a missed flow and that the CPU now owns the packet. The CPU eventually adds the missed flow to one of the separately-searchable linked lists in the flow linked list 230.

If it is determined, in step 430, that the hash value for the signature of the potentially missed flow is in the MOM 360 with the lock bit 364 set, then the missed flow has already been sent to the CPU but not yet added by the CPU to the flow linked list, and control passes to step 432.

In step 432, the walker block is stalled until the MOM record for the hash value is unlocked by a posted write from the CPU. In the illustrate embodiment, step 432 includes snooping CPU writes to the MOM 360. When a write to the MOM 360 is detected, control passes to step 438. In step 438 it is determined whether the CPU write unlocked the MOM record for the hash value of the current data packet. If not, control passes back to step 432 to continue to snoop the CPU writes. The processing of the current data packet by the walker block 354 remains stalled.

However, if it is determine in step 438 that the CPU write unlocked the MOM record for the hash value of the current data packet, then the walker block 354 is free to walk the linked list to find that record. Control passes to step 420 to determine the list record where the flow signature is stored. In the illustrated embodiment, the CPU adds the new flow record to the beginning of the linked list. Therefore, the walker block 354 walks the linked list starting at the beginning in step 420.

In the illustrated embodiment, steps 430, 440, 432, and 438 are performed by an individual walker block 354 in the list walking block 350 interacting with the MOM 360. Step 428 and 442 are performed by the list walking block 350 acting in concert with the egress packet manager block 290 and the DMA 282.

In the illustrated embodiment, step 420 includes steps 421, 422, 424, 425, 426 and 427. In step 421, the flow of the next data packet is dispatched to one of the walker blocks. Any method may be used to dispatch the flow. In the illustrated embodiment, the flow is dispatched by dispatcher block 352 to a walker block 354 by inserting the signature, hash value and extractor number into a assigned packet FIFO 355 on the selected walker block 354. In the illustrated embodiment, the dispatcher block 352 determines whether any of the walker blocks includes an assigned packet FIFO entry with the same hash value, extractor number and signature as the next packet. If so, the packet is assigned to that walker block. In some embodiments, there is only one walker block and step 421 is omitted.

In step 422, the walker block 354 enters one of the separately-searchable linked lists based on the extractor number and hash value. The hash value is added to the offset associated with the extractor number to find a location in the linked list entrance array 236. The pointer at that location, e.g., pointer 235c is used to find the first list record, if any, in the linked list, e.g., list record 232g. In step 424 the pointer is followed to the next list record. For example, the pointer 232c is followed to list record 232g.

In some embodiments, it is possible for a flow to be added by the CPU and the associated MOM entry to be unlocked at any time during 420. When this happens the flow search is restarted. If the restart does not happen and the flow is added at the beginning of the list, then the search could result in a miss and the MOM would no longer be locked and a duplicate flow is added. In these embodiments, step 420 includes a step 425 between step 424 and step 426. In step 425 it is determined whether the CPU has unlocked an entry in the MOM that corresponds to the same linked list that is currently being searched. If so, control passes back to step 422 to re-enter the linked list and re-start walking the list. If not, control passes to step 426 and following steps as described next.

In step 426, the walker block 354 determines whether the signature of the current data packet matches the signature in the list record 232 (e.g., 232g). If so, control passes to step 428, and following steps, described above. If not, control passes to step 427.

In step 427, the walker block 354 determines whether the current list record is the last in the linked list. For example, it is determined whether there is a non-null value in the next record pointer 243b in the current list record. If not, control passes back to step 424 to follow the pointer to the next list record. For example, a pointer in list record 232g is followed to list record 232d.

If it is determined in step 427 that the current list record is the last in the linked list, then the flow is not in the linked list and is a potentially missed flow. Control then passes to step 430 and following steps, described above.

5.0 Method at CPU

FIG. 5 is a flow diagram that illustrates a method 500 for processing missing flow data in a CPU, according to an embodiment. Method 500 includes steps 510, 520, 530.

In step 510, data is received indicating a signature of a data packet for a missing flow. For example, an entry from the missed flows queue 283 is received from DMA block 282. The missed flow queue entry holds data that indicates a location in memory for an unlinked list entry and an associated hash value for entering the linked list and an extractor number for determining an offset for memory location values.

In step 520, the missing flow is added to the linked list. For example, the CPU uses the hash value to select a pointer (e.g., pointer 235c) in the linked list entrance array 236. The CPU places the value from that pointer into the next record pointer 243b of the unlinked list record. The CPU places the location of the unlinked list record in the selected pointer (e.g., pointer 235c) of the linked list entrance array 236. The list entry is now linked to other entries in the linked list. It has been added to the head of the linked list. An advantage of this procedure that adds the new flow list record to the head of the linked list is that CPU time is saved. An additional value of adding to the head of the linked list is that recently received new flows are more likely to have subsequent packets that follow close to the flows which were just previously, thus the walkers are more likely to find the flow quickly. The CPU need not follow the linked list to its last list record. Furthermore, because the list walking block 350 already wrote the signature fields of the list record, the CPU does not spend time asking for, receiving or processing the 320-bit signature. Instead, the CPU merely reads and writes the values of a few pointers.

According to the illustrated embodiment, the CPU also performs step 530. In step 530, the CPU unlocks a MOM record 362 associated with the missing flow just added to the linked list. For example, the CPU makes a posted write to the lock bit of the MOM record that matches the hash value and extractor number of the missed flow just added. By virtue of step 530, the flow classifier block 280 is informed that the associated separately-searchable linked list has been updated by the CPU and can be walked to determine whether a flow signature is actually missing.

6.0 Implementation Mechanisms—Hardware Overview

FIG. 6 is a block diagram that illustrates a computer system 600 which may be modified according to an embodiment of the invention. Computer system 600 is configured as a router.

Computer system 600 includes a communication mechanism such as a bus 610 (or bus 214 in FIG. 2A) for passing information between other internal and external components of the computer system 600. Information is represented as physical signals of a measurable phenomenon, typically electric voltages, but including, in other embodiments, such phenomena as magnetic, electromagnetic, pressure, chemical, molecular, atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 (and CPU 238 in FIG. 2A) performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604 (an memory 250, 270 in FIG. 2A), such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620 and switching system 630, is coupled to bus 610. The special purpose hardware is configured to perform operations not performed by processor 602 quickly enough for special purposes. Examples of application specific ICs include graphics accelerator cards for generating images for display, switching system 630, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 200 in FIG. 2A, is an embodiment of switching system 630. Switching system 630 typically includes multiple communications interfaces, such as communications interface 670, for coupling to multiple other devices. In general, each coupling is with a network link 632 (such as network links 210 in FIG. 2A) that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to a network provides service in response to information received over a network. In the illustrated example, server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, as depicted in FIG. 2A, switching system 630 includes its own processor 238 and memory 250 to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a using information in memory 604 (270 in FIG. 2A) and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 or switching system 630 executing one or more sequences of one or more instructions contained in memory, such as memory 604. Such instructions, also called software and program code, may be read into memory, such as memory 604, from another computer-readable medium such as storage device 608. Execution of the sequences of instructions contained in memory causes processor 602 or switching system 630 or both to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software unless otherwise explicitly stated.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 or switching system 630 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface 670 receives the instructions and data carried in the infrared signal and places information representing the instructions and data onto bus 610. Bus 610 carries the information to memory 604 from which processor 602 or switching system 630 retrieves and executes the instructions using some of the data sent with the instructions. The instructions and data received in memory 604 may optionally be stored on storage device 608, or switching system 630 either before or after execution by the processor 602 or switching system 630.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
a circuit configured to:
    determine a particular flow associated with a particular data packet;
    determine whether the particular flow is already stored in a flow data structure;
    determine whether the particular flow has already been sent to one or more processors;
    send particular missing flow data that indicates the particular flow to the one or more processors;
    store, into an outstanding missing flow data structure different from the flow data structure, outstanding missing flow data that indicates the particular flow has been sent to the one or more processors but is not yet included in the flow data structure; and
    determine that the particular flow is already stored in the flow data structure in response to the outstanding missing flow data being modified to indicate that the particular flow has been added to the flow data structure.

2. The apparatus of claim 1, wherein said circuit is further configured to determine whether the outstanding missing flow data in the outstanding missing flow data structure indicates the particular flow.

3. The apparatus of claim 1, wherein the flow data structure comprises a linked list, wherein the flow data structure indicates a plurality of flows of data packets, wherein every data packet in one flow of data packets has identical values for a flow definition set of one or more data fields in the particular data packet, and wherein said circuit is further configured to:
    append at least some of the identical values from the particular data packet for the flow definition set of the one or more data fields into a signature field of a particular linked list entry that is not included in the flow data structure; and
    send a location for the particular linked list entry.

4. The apparatus of claim 3, wherein the circuit is further configured to:
    generate signature data for the data packet by appending at least some of the identical values from the data packet for the flow definition set, wherein the linked list comprises list entries in which each list entry includes the signature data for the one flow of data packets and a pointer to a location of a next list entry in a memory;
    store a walker-specific signature for the one flow of data packets associated with the signature data;
    determine whether the one flow of data packets is already stored in the flow data structure;
    walk the linked list by following the pointer to the location of the next list entry in the memory;
    determine whether a signature in the next list entry matches the walker-specific signature;
    determine whether the walker-specific signature matches the signature data; and
    place data into a data packet queue, wherein the data indicates the location of the next list entry in the memory.

5. The apparatus of claim 1, wherein the one or more processors are configured to:
    receive the particular missing flow data;
    add the particular flow that is indicated in the particular missing flow data to the flow data structure in response to receiving the particular missing flow data;
    forward the data packets based, at least in part, on the particular flow; and
    remove the outstanding missing flow data from the outstanding missing flow data structure.

6. The apparatus of claim 5, wherein the one or more processors are further configured to write a value to an outstanding field associated with the particular flow in the outstanding missing flow data structure, and wherein the value indicates the particular flow is no longer outstanding as a missing flow.

7. The apparatus of claim 1, wherein the outstanding missing flow data is modified by the one or more processors.

8. The apparatus of claim 1, wherein the circuit is further configured to determine whether the particular flow has already been sent to the one or more processors if the particular flow is not already stored in the flow data structure, and wherein the particular missing flow data is sent to the one or more processors if the particular flow has not already been sent to the one or more processors.

9. An apparatus, comprising:
    means for determining whether a flow is stored in a flow data structure;

means for determining whether the flow has been sent in missing flow data to processing circuitry if the flow is not already stored in the flow data structure;

means for sending particular missing flow data that indicates the flow to the processing circuitry if the particular missing flow data has not already been sent;

means for storing, into a missing flow data structure, outstanding missing flow data that indicates the flow has been sent to the processing circuitry but is not yet included in the flow data structure; and means for modifying the missing flow data to indicate that the flow has been added to the flow data structure.

10. The apparatus of claim 9, further comprising means for determining whether the outstanding missing flow data in the missing flow data structure indicates the flow.

11. The apparatus of claim 9, wherein the flow data structure is a linked list, and wherein the apparatus further comprises:

means for appending one or more data fields from a data packet into a signature field of a linked list entry that is not included in the flow data structure; and means for sending a location for the linked list entry.

12. The apparatus of claim 9, further comprising:

means for receiving the missing flow data that indicates a particular flow not already stored in the flow data structure; and means for adding the particular flow to the flow data structure, then removing the particular flow from the outstanding missing flow data structure.

13. The apparatus of claim 12, further comprising means for writing a value to an outstanding field associated with the particular flow in the outstanding missing flow data structure, wherein the value indicates the particular flow is no longer outstanding as a missing flow.

14. The apparatus of claim 9, further comprising:

means for finding missed flows; and memory means for holding data that indicates the missed flows include signatures not yet added to the flow data structure.

15. An apparatus, comprising:

a signature register configured to:

hold data that indicates a location of data packets in memory; and store signatures for the data packets and determine whether the signatures associated with flows are already stored in a flow data structure;

a packet dispatcher configured to:

determine flows associated with data packets by determining signature data for the data packets, the packet dispatcher further configured to determine whether the signatures match the signature data; and place the data for the data packets into a data packet queue based on the signature data associated with the data packets; and an outstanding missing flow memory configured to hold data that indicates missed flows already identified in the signature registers but having signatures not yet added to the flow data structure.

16. The apparatus of claim 15, wherein the flow data structure comprises a linked list, wherein the flows are grouped into different lists based on hash values of the signatures, and wherein a hash value of the signature data indicates a position of the signature data in the linked list.

17. The apparatus of claim 16, wherein the signature data comprises 320 bits, wherein a 32-bit hash is performed on the signature data, and wherein the first 8 bits of the hash value indicate the position of the signature data.

18. The apparatus of claim 16, wherein the signature register is further configured to search separately searchable linked lists in parallel.

19. The apparatus of claim 15, further comprising an egress packet manager, wherein the egress packet manager is configured to:

receive a location of a found flow that has already been stored in the flow data structure; and update a data packet descriptor to indicate the location of the found flow, wherein the data packet descriptor indicates that the data packets belong to the found flow.

20. An article comprising a non-transitory storage medium, having stored thereon instructions that, in response to execution by a processing device, result in the processing device performing operations comprising:

determining a flow associated with a particular data packet received through a network interface;

determining whether the flow is already stored in a flow data structure;

receiving a location of a found flow that has already been stored in the flow data structure;

updating a data packet descriptor to indicate the location of the found flow, wherein the data packet descriptor indicates that a data packet belongs to the found flow;

determining whether the flow has already been sent as missing flow data to one or more processing devices when the particular flow is not already stored in the flow data structure;

sending particular missing flow data that indicates the flow to the one or more processing devices when the particular missing flow data has not already been sent; and storing, into an outstanding missing flow data structure different from the flow data structure, outstanding missing flow data that indicates the flow has been sent to the one or more processing devices but is not yet included in the flow data structure.

21. The article of claim 20, wherein the operations further comprise determining whether the outstanding missing flow data in the outstanding missing flow data structure indicates the flow.

22. The article of claim 20, wherein the operations further comprise:

appending one or more data fields from the particular data packet into a signature field of a linked list entry that is not included in the flow data structure; and sending a location for the linked list entry.

23. The article of claim 20, wherein the operations further comprise:

receiving missing flow data that indicates a particular flow not already stored in the flow data structure; and adding the particular flow that is indicated in the missing flow data to the flow data structure, then removing the particular flow from the outstanding missing flow data structure.

24. The article of claim 20, wherein the operations further comprise writing a value to an outstanding field associated with the flow in the outstanding missing flow data structure, wherein the value indicates that the flow is no longer outstanding as a missing flow.

25. The article of claim 20, wherein the operations further comprise:

modifying the outstanding missing flow data to indicate that the flow has been added to the flow data structure.

26. A method, comprising:
- determining a flow associated with a particular data packet;
- determining whether the flow is already stored in a flow data structure;
- determining whether the flow has previously been identified as a missed flow;
- in response to determining that the flow has not been identified as missed flow and has not been stored in the flow data structure, sending the flow as missing flow data to a processing device;
- storing the missing flow data in a missing flow data structure that indicates the flow has been sent to the processing device but has not been stored in the flow data structure; and
- modifying the missing flow data to indicate that the flow has been added to the missing flow data structure.

27. The method of claim 26, further comprising determining whether the missing flow data in the missing flow data structure indicates the flow.

28. The method of claim 26, wherein the flow data structure is a linked list, and wherein the method further comprises:
- appending one or more data fields from the data packet into a signature field of a linked list entry that is not included in the flow data structure; and
- sending a location for the linked list entry.

29. The method of claim 26, further comprising:
- finding missed flows; and
- holding data that indicates the missed flows include signatures not yet added to the flow data structure.

30. The method of claim 26, further comprising:
- receiving the missing flow data that indicates a particular flow that has not been stored in the flow data structure; and
- adding the particular flow to the flow data structure, then removing the particular flow from the missing flow data structure.

31. The method of claim 30, further comprising writing a value to a field associated with the flow in the missing flow data structure, wherein the value indicates the flow is no longer missing.

* * * * *